United States Patent
Yoshii

(10) Patent No.: US 7,831,851 B2
(45) Date of Patent: Nov. 9, 2010

(54) SWITCHING REGULATOR

(75) Inventor: Kohji Yoshii, Hyogo (JP)

(73) Assignee: Ricoh Company, Ltd., Tokyo (JP)

( * ) Notice: Subject to any disclaimer, the term of this patent is extended or adjusted under 35 U.S.C. 154(b) by 923 days.

(21) Appl. No.: 10/580,133

(22) PCT Filed: Sep. 28, 2005

(86) PCT No.: PCT/JP2005/018397

§ 371 (c)(1),
(2), (4) Date: May 19, 2006

(87) PCT Pub. No.: WO2006/036001

PCT Pub. Date: Apr. 6, 2006

(65) Prior Publication Data

US 2007/0114986 A1    May 24, 2007

(30) Foreign Application Priority Data

Sep. 30, 2004 (JP) .............................. 2004-287092

(51) Int. Cl.
*G06F 1/00* (2006.01)
(52) U.S. Cl. ................. 713/324; 713/300; 713/320; 323/317; 323/351
(58) Field of Classification Search ............. 323/317, 323/351; 713/300, 320, 324
See application file for complete search history.

(56) References Cited

U.S. PATENT DOCUMENTS

| | | | |
|---|---|---|---|
| 6,212,079 B1 * | 4/2001 | Balakrishnan et al. | 363/21.03 |
| 6,252,783 B1 * | 6/2001 | Huh et al. | 363/21.01 |
| 6,278,265 B1 * | 8/2001 | Yokosawa | 323/282 |
| 6,288,914 B1 * | 9/2001 | Sato | 363/18 |
| 6,393,572 B1 | 5/2002 | Datta et al. | |
| 6,424,128 B1 * | 7/2002 | Hiraki et al. | 323/268 |
| 6,498,467 B1 * | 12/2002 | Stratakos | 323/284 |
| 6,518,848 B2 * | 2/2003 | Teraishi | 331/74 |

(Continued)

FOREIGN PATENT DOCUMENTS

DE    32 41 821 A    5/1984

(Continued)

OTHER PUBLICATIONS

Extended European Search Report dated Aug. 11, 2008. (9 pages).

*Primary Examiner*—Chun Cao
*Assistant Examiner*—Jaweed A Abbaszadeh
(74) *Attorney, Agent, or Firm*—Dickstein Shapiro LLP

(57) ABSTRACT

A switching regulator is disclosed that includes a switching transistor controlling output of an input voltage by switching in accordance with an input control signal; a smoothing circuit part configured to smooth the output voltage of the switching transistor and output the smoothed voltage to an output terminal; a control circuit part configured to control the switching of the switching transistor in synchronization with an externally input clock signal so that a voltage at the output terminal is a predetermined constant voltage; and a clock signal detector circuit part configured to detect the presence or absence of inputting of the clock signal. Upon detecting stoppage of the inputting of the clock signal, the clock signal detector circuit part causes the control circuit part to stop operating and perform a standby operation for reducing power consumption and thereby to turn off the switching transistor.

10 Claims, 8 Drawing Sheets

U.S. PATENT DOCUMENTS

| | | | |
|---|---|---|---|
| 6,646,894 B2 * | 11/2003 | Hong et al. | 363/21.01 |
| 6,662,084 B2 * | 12/2003 | Hiraki et al. | 700/298 |
| 6,667,603 B2 * | 12/2003 | Hiraki et al. | 323/268 |
| 6,737,839 B2 * | 5/2004 | Hiraki et al. | 323/268 |
| 6,781,356 B1 * | 8/2004 | Yang et al. | 323/282 |
| 6,836,417 B2 * | 12/2004 | Hiraki et al. | 323/268 |
| 6,969,979 B2 * | 11/2005 | Kohout et al. | 323/282 |
| 6,986,067 B2 * | 1/2006 | Odaohhara et al. | 713/320 |
| 7,034,513 B2 * | 4/2006 | Gan et al. | 323/285 |
| 7,085,943 B2 * | 8/2006 | Chun et al. | 713/300 |
| 7,199,568 B2 * | 4/2007 | Matsuo et al. | 323/283 |
| 2001/0010638 A1 * | 8/2001 | Konno | 363/21.07 |
| 2002/0001213 A1 * | 1/2002 | Hinman et al. | 363/147 |
| 2002/0041178 A1 * | 4/2002 | Hiraki et al. | 323/272 |
| 2002/0135338 A1 | 9/2002 | Hobrecht et al. | |
| 2002/0158618 A1 * | 10/2002 | Hiraki et al. | 323/371 |
| 2002/0196005 A1 * | 12/2002 | Hiraki et al. | 323/282 |
| 2003/0034823 A1 * | 2/2003 | Hiraki et al. | 327/334 |
| 2005/0116748 A1 | 6/2005 | Deppe | |
| 2005/0200341 A1 * | 9/2005 | Kohout et al. | 323/282 |

FOREIGN PATENT DOCUMENTS

| | | |
|---|---|---|
| EP | 1 587 208 A | 10/2005 |
| JP | 58 151618 A | 9/1983 |
| JP | 9-121535 | 5/1997 |
| JP | 2002-262554 | 9/2002 |
| JP | 2002-543728 | 12/2002 |
| WO | WO-2003/058804 | 7/2003 |

\* cited by examiner

SWITCHING REGULATOR

TECHNICAL FIELD

The present invention relates to a switching regulator that reduces power consumption by performing a predetermined standby operation upon suspension of inputting of a clock signal.

Background Art

In recent years, small-size portable apparatuses such as cellular phones have been widely used. Such small-size portable apparatuses employ small-size rechargeable (secondary) batteries as power supply. In order to make the rechargeable batteries smaller in size and usable for as long a period as possible, attempts have been made to improve battery performance and make apparatuses consume less power.

Most of the power supply circuits used in such small-size portable apparatuses employ a switching regulator in order to improve efficiency. When the apparatus enters a standby state, the power supply circuit also switches to a standby operation consuming less power, thereby reducing power consumption by the apparatus.

FIG. 1 is a circuit diagram showing a conventional switching regulator 100. Such a circuit is employed in, for instance, LTC1878, a power supply IC of Linear Technology-Corporation.

The switching regulator 100 of FIG. 1 generates a predetermined constant voltage from a supply voltage Vdd from a direct current power supply 110, and outputs the constant voltage to a load 111.

The switching regulator 100 includes a switching transistor Ma performing output control of the supply voltage Vdd, a transistor Mb for synchronous rectification (synchronous rectification transistor Mb), an inductor La and a capacitor Ca for smoothing, and resistors Ra and Rb for output voltage detection generating and outputting a divided voltage Vda by dividing a voltage Vo output to the load 111.

The switching regulator 100 also includes a reference voltage generator circuit 102, an error amplifier circuit 103, and a triangle wave generator circuit 104. The reference voltage generator circuit 102 generates and outputs a predetermined reference voltage Vr. The error amplifier circuit 103 compares the divided voltage Vda and the reference voltage Vr, amplifies the difference between the voltages Vda and Vr, and outputs the amplified difference. The triangle wave generator circuit 104 generates and outputs a triangle wave signal TW of a predetermined frequency synchronizing with an externally input clock signal. The switching regulator 100 further includes a PWM (pulse-width modulator) circuit 105 and a drive circuit 106. The PWM circuit 105 generates a pulse signal for performing PWM control based on the output voltage of the error amplifier circuit 103 and the triangle wave signal TW from the triangle wave generator circuit 104, and outputs the generated pulse signal. The drive circuit 106 drives the switching transistor Ma and the synchronous rectification transistor Mb by generating a control signal PD for controlling switching of the switching transistor Ma and a control signal ND for controlling switching of the synchronous rectification transistor Mb in accordance with the pulse signal from the PWM circuit 105.

In the switching regulator 100, all parts except the inductor La and the capacitor Ca are integrated into a single IC 108. The IC has a TVdd terminal, a GND terminal, a TCLK terminal, a TSTB terminal, an FB terminal, and an LX terminal. A clock signal CLK is externally input to the TCLK terminal.

The triangle wave generator circuit 104 generates and outputs a triangle wave signal synchronizing with the clock signal CLK. A standby signal STB is externally input to the TSTB terminal. The STB signal is input to each of the error amplifier circuit 103, the triangle wave generator circuit 104, the PWM circuit 105, and the drive circuit 106. When the standby signal STB is asserted, each of the error amplifier circuit 103, the triangle wave generator circuit 104, the PWM circuit 105, and the drive circuit 106 stops its operation, and each of the switching transistor Ma and the synchronous rectification transistor Mb turns OFF.

On the other hand, the power supply circuit is converted into an integrated-circuit (IC) so as to be housed in as small a package as possible for downsizing. Therefore, it is important to reduce the number of terminals of the IC. Accordingly, it is considered that the number of terminals is reduced by assigning multiple functions to one IC terminal.

FIG. 2 is a circuit diagram showing a switching regulator configured in this manner (for instance, Japanese Laid-Open Patent Application No. 9-121535).

Referring to FIG. 2, the Vc terminal of an IC for switching regulator 120 is grounded through an externally attached resistor RlO and capacitor ClO. The collector of an NPN transistor Q1 is connected to the connection of the resistor RlO and the capacitor ClO. The emitter of the NPN transistor Q1 is grounded.

The Vc terminal is connected to the output of an error amplifier circuit in the IC 120, so that phase compensation is performed with the externally attached resistor RlO and capacitor ClO. Further, a soft-start function is realized by charging the capacitor ClO with a constant current source provided in the IC 120. Further, when the voltage at the Vc terminal is reduced by turning ON the NPN transistor Q1, the IC 120 is put in a standby state by a circuit contained in the IC 120, thereby reducing power consumption. Thus, an increase in the number of IC terminals is avoided by enabling switching among the three operations of phase compensation, soft-start, and standby using the single terminal Vc.

However, in the configurations of FIGS. 10 and 11, in order to stop the operation of the switching regulator to reduce power consumption, an external circuit generating a control signal for causing such an operation to be performed is required. If the external circuit is formed of an IC, a terminal for outputting the control signal is required. Further, in the configuration of FIG. 1, a terminal for inputting the external control signal is required. The number of IC terminals depends on an IC package to be used. If the number of required IC terminals exceeds the number of terminals of the IC package to be used even by one, a larger, more expensive package should be used. Further, if the IC package to be used has a free extra terminal, another function may be added to the terminal, thus making it possible to increase the value of the IC. Accordingly, it has been a very important task to reduce the number of terminals of an IC.

DISCLOSURE OF THE INVENTION

Accordingly, it is a general object of the present invention to provide a switching regulator in which the above-described disadvantages are eliminated.

A more specific object of the present invention is to provide a switching regulator that switches to a standby operation in accordance with the presence or absence of an external clock signal necessary for the operation of the switching regulator, thereby omitting a dedicated IC terminal for switching the switching regulator to the standby operation.

The above objects of the present invention are achieved by a switching regulator converting an input voltage into a predetermined constant voltage and outputting the constant voltage from an output terminal, the switching regulator including: a switching transistor controlling output of the input voltage by switching in accordance with a control signal input to a control electrode; a smoothing circuit part configured to smooth an output voltage of the switching transistor and output the smoothed output voltage to the output terminal; a control circuit part configured to control the switching of the switching transistor in synchronization with an externally input clock signal so that a voltage at the; output terminal is the predetermined constant voltage; and a clock signal detector circuit part configured to detect presence or absence of inputting of the clock signal, wherein upon detecting stoppage of the inputting of the clock signal, the clock signal detector circuit part causes the control circuit part to stop operating and perform a standby operation for reducing power consumption and thereby to turn off the switching transistor.

A switching regulator according to one embodiment of the present invention includes a clock signal detector circuit part that, upon detecting stoppage of inputting of a clock signal, causes a control circuit part to stop operating and perform a standby operation for reducing power consumption and thereby to turn off the switching transistor. This obviates the need for an IC terminal to which a standby signal is externally input, which is conventionally required as an independent terminal, in an IC forming the switching regulator. Further, if an external control circuit generating the standby signal is formed of an IC, a terminal for outputting the standby signal becomes unnecessary in the IC. Thus, it is possible to save on the terminals of an IC package. If this saving results in a newly available terminal, it is possible to provide the IC with an additional function. Saving on IC terminals makes it possible to use a less expensive, smaller IC package.

BRIEF DESCRIPTION OF THE DRAWINGS

Other objects, features and advantages of the present invention will become more apparent from the following detailed description when read in conjunction with the accompanying drawings, in which.

BEST MODE FOR CARRYING OUT THE INVENTION

A description is given below, with reference to the accompanying drawings, of embodiments of the present invention

First Embodiment

Figure 1:
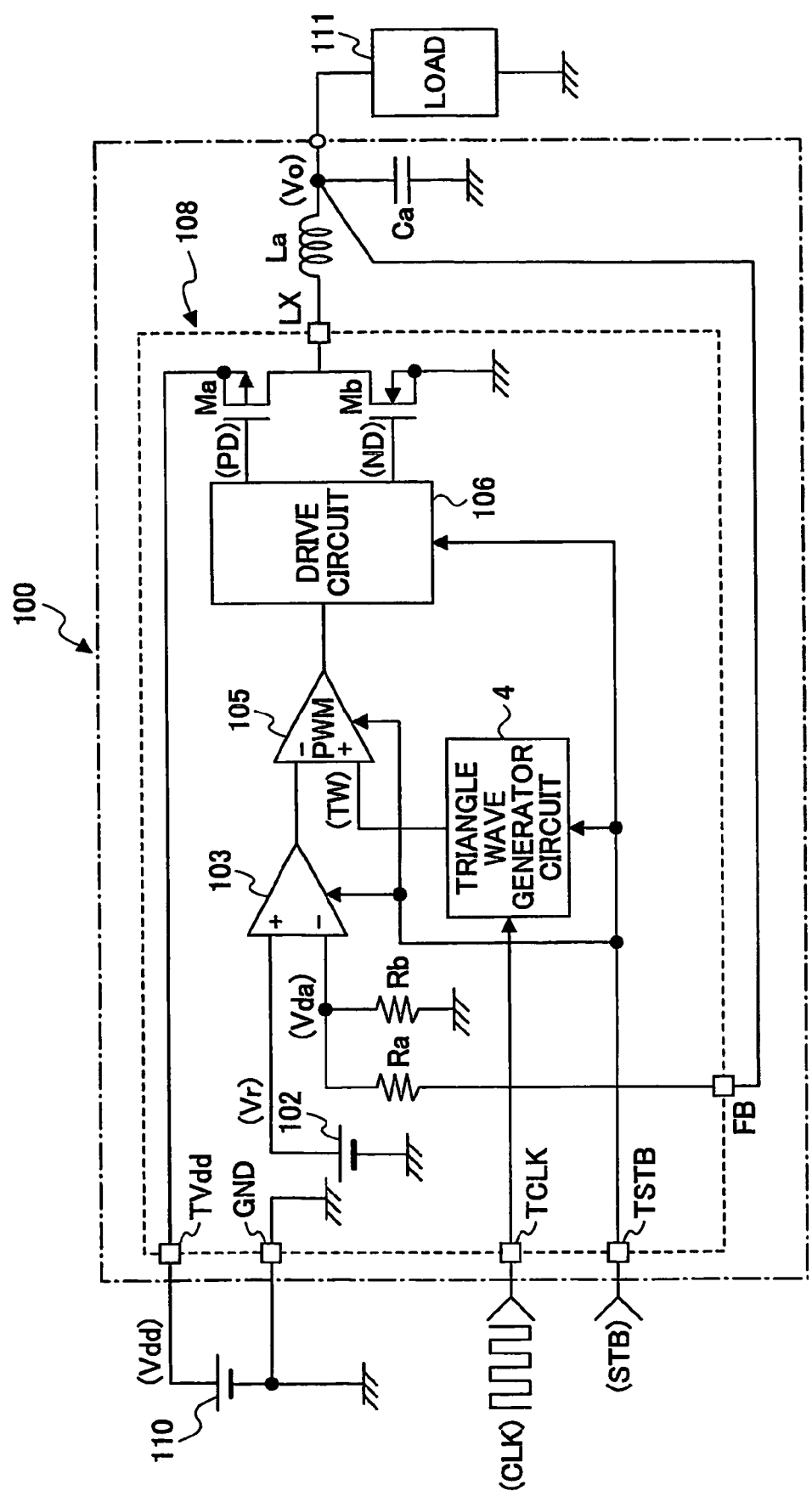
FIG. 1 is a circuit diagram showing a conventional switching regulator.
Figure 2:
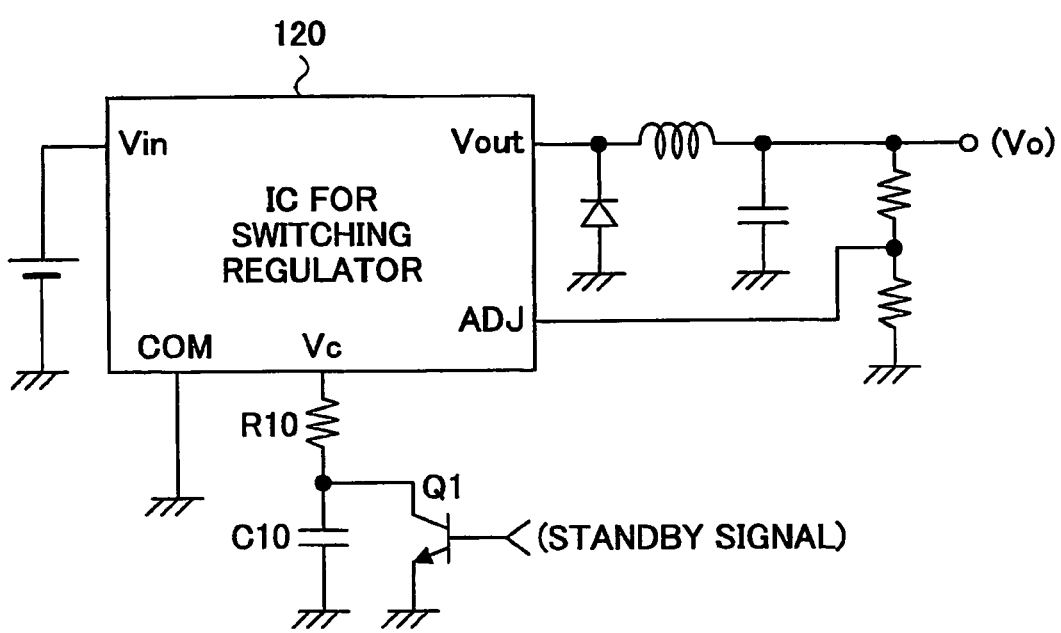
FIG. 2 is a circuit diagram showing another conventional switching regulator.
Figure 3:
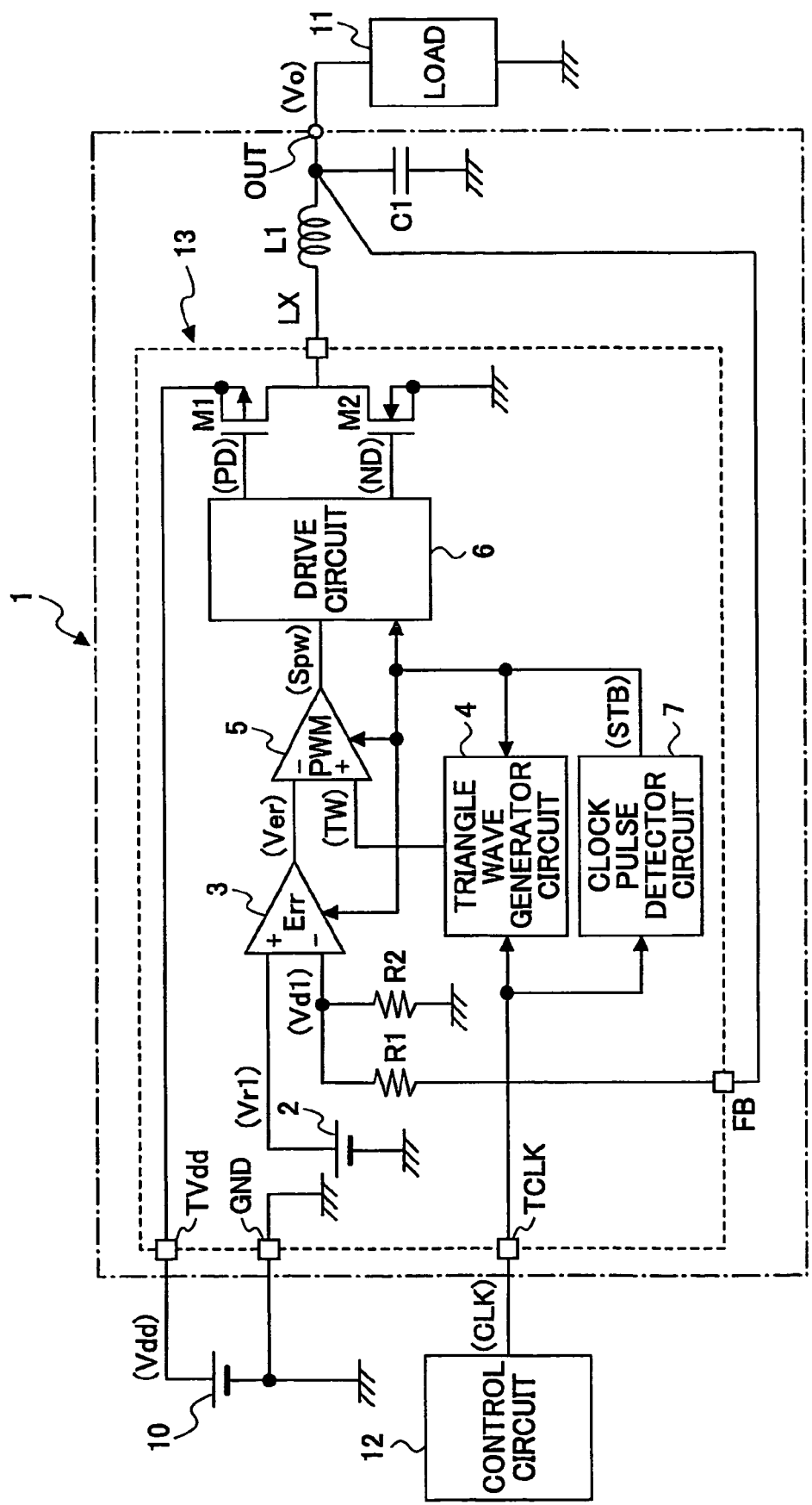
FIG. 3 is a circuit diagram showing a configuration of a switching regulator according to a first embodiment of the present invention.

FIG. 3 is a circuit diagram showing a configuration of a switching regulator 1 according to a first embodiment of the present invention.

Referring to FIG. 3, the switching regulator 1 converts a supply voltage Vdd input from a direct current power supply 10 into a predetermined constant voltage, and outputs the constant voltage to a load 11 connected to an output terminal OUT.

The switching regulator 1 includes a switching transistor M1 formed of a PMOS transistor performing output control of the supply voltage Vdd input to a TVdd terminal, a transistor M2 formed of an NMOS transistor for synchronous rectification (synchronous rectification transistor M2), an inductor L1 and a capacitor C1 for smoothing, and resistors R1 and R2 for output voltage detection generating and outputting a divided voltage VdI by dividing a voltage Vo output from the output terminal OUT. The switching regulator 1 also includes a reference voltage generator circuit 2, an error amplifier circuit 3, and a triangle wave generator circuit 4. The reference voltage generator circuit 2 generates and outputs a predetermined reference voltage VrI. The error amplifier circuit 3 compares the divided voltage VdI and the reference voltage VrI, generates a voltage Ver by amplifying the difference between the voltages VdI and VrI, and outputs the voltage Ver. The triangle wave generator circuit 4 generates and outputs a predetermined triangle wave signal TW synchronizing with a clock signal CLK input from the clock signal generator part of an external control circuit 12.

The switching regulator 1 further includes a PWM circuit 5 and a drive circuit 6. The PWM circuit 5 compares the output voltage Ver of the error amplifier circuit 3 and the voltage of the triangle wave signal TW provided from the triangle wave generator circuit 4, thereby generating and outputting a pulse signal Spw for performing PWM control. The pulse signal Spw has a pulse width according to the output voltage Ver. The drive circuit 6 drives the switching transistor M1 and the synchronous rectification transistor M2 by generating a control signal PD for controlling switching of the switching transistor M1 and a control signal ND for controlling switching of the synchronous rectification transistor M2 in accordance with the pulse signal Spw provided from the PWM circuit 5.

The switching regulator 1 further includes a clock pulse detector circuit 7. The clock pulse detector circuit 7 controls the operation of each of the error amplifier circuit 3, the triangle wave generator circuit 4, the PWM circuit 5, and the drive circuit 6 according to whether the clock signal CLK is input. In the switching regulator 1, all parts except the inductor L1 and the capacitor C1 are integrated into a single IC 13.

The IC 13 includes the TVdd terminal, a GND terminal, a TCLK terminal, an LX terminal, and an FB terminal. The supply voltage Vdd, which is positive supply voltage, is input to the TVdd terminal. The GND terminal is connected to ground or a negative supply voltage. The clock signal CLK is input to the TCLK terminal.

The reference voltage generator circuit 2, the error amplifier circuit 3, the triangle wave generator circuit 4, the PWM circuit 5, the drive circuit 6, and the resistors R1 and R2 may form a control circuit part. The synchronous rectification transistor M2, the inductor L1, and the capacitor C1 may form a smoothing circuit part. The clock pulse detector circuit 7 may form a clock signal detector circuit part. The resistors R1 and R2 may form an output voltage detector circuit. The TVdd terminal may form a first power supply terminal. The GND terminal may form a second power supply terminal. The TCLK terminal may form a clock signal input terminal. The LX terminal may form a pulse output terminal. The FB terminal may form an output voltage input terminal.

The direct current power supply 10 is connected between the TVdd terminal and the GND terminal. The switching transistor M1 and the synchronous rectification transistor M2 are connected in series between the TVdd terminal and ground. The connection of the switching transistor M1 and the synchronous rectification transistor M2 is connected to the LX terminal. The inductor L1 is connected between the LX terminal and the output terminal OUT. The capacitor C1 is connected between the output terminal OUT and ground. A series circuit of the resistors R1 and R2 is connected through the FB terminal between the output terminal OUT and ground. The connection of the resistors R1 and R2 is connected to the inverting input terminal of the error amplifier circuit 3. The reference voltage Vr1 is input to the non-inverting input terminal of the error amplifier circuit 3.

The output voltage Ver of the error amplifier circuit 3 is output to the inverting input terminal of a comparator forming the PWM circuit 5. The triangle wave signal TW is output to the non-inverting input terminal of the comparator forming the PWM circuit 5. The pulse signal Spw provided from the PWM circuit 5 is output to the drive circuit 6. The drive circuit 6 outputs the control signal PD for controlling switching of the switching transistor M1 to the gate of the switching transistor M1. The drive circuit 6 outputs the control signal ND for controlling switching of the synchronous rectification transistor M2 to the gate of the synchronous rectification transistor M2. The clock pulse detector circuit 7 outputs a standby signal STB to each of the error amplifier circuit 3, the triangle wave generator circuit 4, the PWM circuit 5, and the drive circuit 6. The standby signal STB is asserted according to whether the clock signal CLK is input.

In this configuration, when the switching transistor M1 performs switching so as to turn ON, the inductor L1 is supplied with current. At this point, the synchronous rectification transistor M2 is turned OFF. When the switching transistor M1 turns OFF, the synchronous rectification transistor M2 turns ON, so that energy stored in the inductor L1 is released through the synchronous rectification transistor M2. Current generated at this point is smoothed by the capacitor C1 to be output to the load 11 from the output terminal OUT. Further, the output voltage Vo output from the output terminal OUT is divided between the resistors R1 and R2 for output voltage detection, so that the divided voltage VdI is input to the inverting input terminal of the error amplifier circuit 3.

When the output voltage Vo of the switching regulator 1 increases, the output voltage Ver of the error amplifier circuit 3 decreases, so that the duty cycle of the pulse signal Spw provided from the PWM circuit 5 is reduced. As a result, the ON-time of the switching transistor M1 is reduced, so that the switching regulator 1 is controlled to reduce its output voltage Vo. When the output voltage Vo of the switching regulator 1 is reduced, the opposite of the above-described operation is performed. In consequence, the output voltage Vo of the switching regulator 1 is controlled to be constant.

Here, if inputting of the clock signal CLK from the control circuit 12 to the triangle wave generator circuit 4 through the TCLK terminal is stopped, that is, if the TCLK terminal is fixed to a high level (HIGH) or low level (LOW), the clock pulse detector circuit 7 asserts the standby signal STB output to each of the error amplifier circuit 3, the triangle wave generator circuit 4, the PWM circuit 5, and the drive circuit 6. When the standby signal STB is asserted, each of the error amplifier circuit 3, the triangle wave generator circuit 4, the PWM circuit 5, and the drive circuit 6 stops its operation, and both the switching transistor M1 and the synchronous rectification transistor M2 turn OFF, so that the IC 13 switches to a standby operation (standby mode), which is a low power consumption operation mode.

The clock pulse detector circuit 7 negates the standby signal STB output: to each of the error amplifier circuit 3, the triangle wave generator circuit 4, the PWM circuit 5, and the drive circuit 6 while the clock signal CLK is being input from the control circuit 12 to the triangle wave generator circuit 4 through the TCLK terminal, that is, while the level of the TCLK terminal is alternating between HIGH and LOW in a predetermined cycle. When the standby signal STB is negated, each of the error amplifier circuit 3, the triangle wave generator circuit 4, the PWM circuit 5, and the drive circuit 6 starts to operate, and the switching transistor M1 and the synchronous rectification transistor M2 perform switching in accordance with the control signals PD and ND, respectively, input to their respective gates. Thus, the IC 13 enters a normal operating condition.

Figure 4:
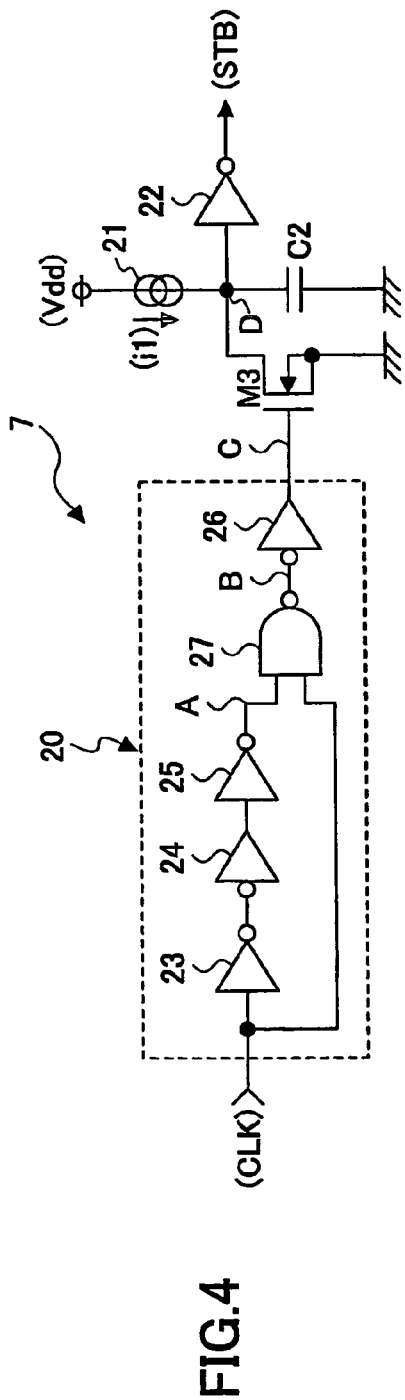
FIG. 4 is a circuit diagram showing a configuration of a clock pulse detector circuit according to the first embodiment of the present invention.

Next, FIG. 4 is a circuit diagram showing a configuration of the clock pulse detector circuit 7.

Referring to FIG. 4, the clock pulse detector circuit 7 includes an edge detector circuit 20 detecting the rising edge of the clock: signal CLK, an NMOS transistor M3, a capacitor C2, a current source 21 supplying a current i1, and an inverter 22. The edge detector circuit 20 includes inverters 23 through 26 and a NAND circuit 27. The current source 21 and the capacitor C2 may form an integrating circuit. The NMOS transistor M3 may form a switching device. The inverter 22 may form a binarizing circuit. A first input terminal of the NAND circuit 27 is connected to the TCLK terminal. The inverters 23 through 25 are connected in series between the TCLK terminal and a second input terminal of the NAND circuit 27.

The inverter 26 is connected between the output terminal of the NAND circuit 27 and the gate of the NMOS transistor M3. On the other hand, the current source 21 and the capacitor C2 are connected in series between the supply voltage Vdd and ground. The transistor M3 and the capacitor C2 are connected in parallel between the supply voltage Vdd and ground. The input terminal of the inverter 22 is connected to the connection of the current source 21 and the capacitor C2. The standby signal STB is output from the output terminal of the inverter 22. The connection of the output terminal of the inverter 25 and the second input terminal of the NAND circuit 27 is referred to as A. The connection of the output terminal of the NAND circuit 27 and the input terminal of the inverter: 26 is referred to as B. Further, the connection of the output terminal of the inverter 26 and the gate of the NMOS transistor M3 is referred to as C. The connection of the current source 21 and the capacitor C2 is referred to as D.

Figure 5:
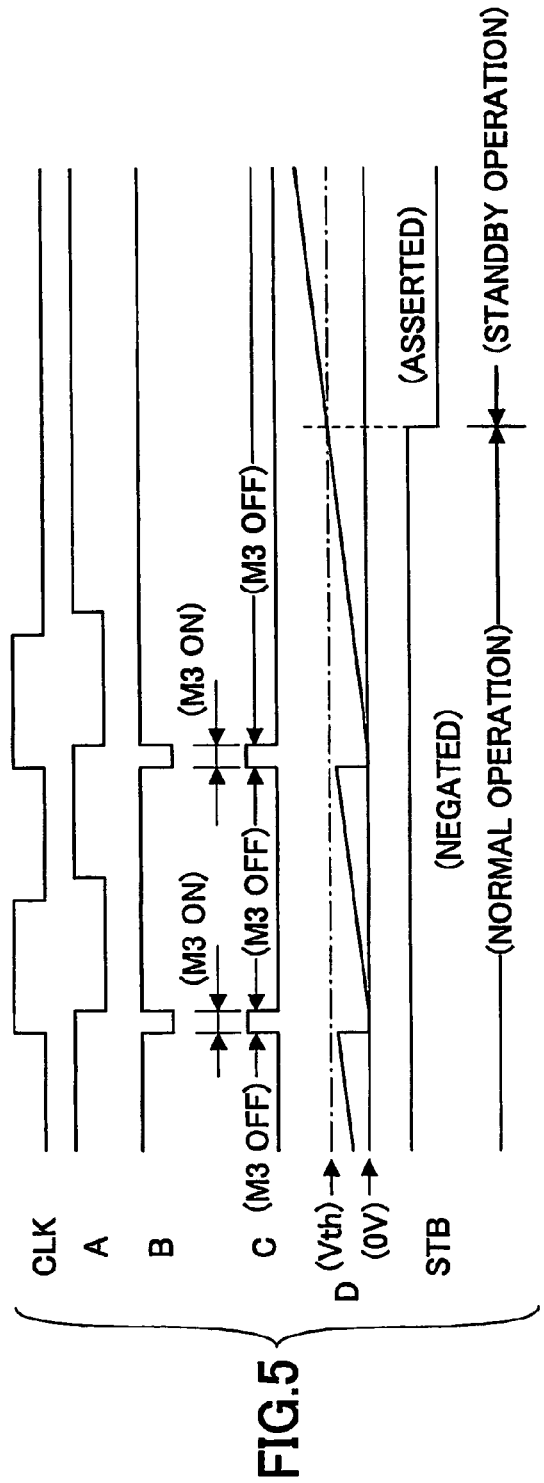
FIG. 5 is a timing chart of signals showing an operation of the clock pulse detector circuit of FIG. 4 according to the first embodiment of the present invention.

FIG. 5 is a timing chart of signals showing an operation of the clock pulse detector circuit 7 of FIG. 4 having the above-described configuration. A description is given, with reference to FIG. 5, of an operation of the clock pulse detector circuit 7.

The signal level of a waveform at the A point is the reversal of that of the clock signal CLK with a delay caused by the inverters 23 through 25. Accordingly, only when the clock signal CLK rises, both input terminals of the NAND circuit 27 are HIGH for a period of the delay caused by the inverters 23 through 25. As a result, a waveform at the B point, that is, the output signal of the NAND circuit 27, is LOW for a period equivalent to the period of the delay caused by the inverters 23 through 25 when the clock signal CLK rises. The output signal of the NAND circuit 27 has its signal level inverted by the inverter 26, and is input to the gate of the NMOS transistor M3. The terminal voltage of the capacitor C2, that is, a voltage at the D point, is substantially ground voltage when the NMOS transistor M3 is ON, but increases when the NMOS transistor M3 is OFF. However, if the voltage at the D point does not reach the threshold voltage Vth of the inverter 22 before the next rise in the clock signal CLK, the standby signal STB is not asserted because the output terminal of the inverter 22 is kept HIGH or maintains a high level. That is, by making a time period for charging the capacitor C2 until the voltage at the D point reaches the threshold voltage Vth of the inverter 22 slightly longer than the interval at which the edge detector circuit 20 detects the rising edge of the clock signal CLK, it is possible to prevent the IC 13 from switching to the standby operation (or entering the standby mode) while the clock signal CLK is being input and to cause the IC 13 to switch to the standby operation immediately after disappearance of a clock pulse from the clock signal ClK.

With the TCLK terminal being fixed to HIGH or LOW without inputting of the clock signal CLK, the output terminal of the inverter 26, which forms the output terminal of the edge detector circuit 20, is LOW, so that the NMOS transistor M3 is OFF. Therefore, the voltage at the D point increases until it exceeds the threshold voltage Vth of the inverter 22. When the voltage at the D point exceeds the threshold voltage Vth of the inverter 22, the signal level of the output signal of the inverter 22 is inverted to LOW, so that the standby signal STB is asserted. When the clock signal CLK is input to the TCLK terminal, the standby signal STB is negated.

Figure 6:
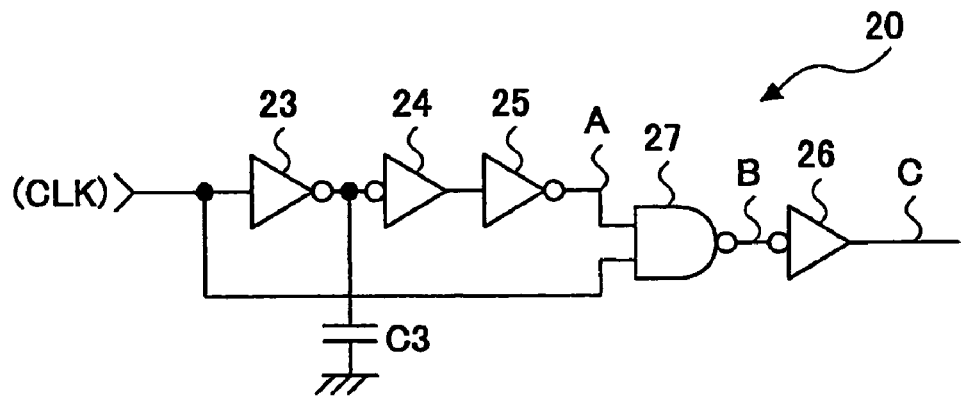
FIG. 6 is a diagram showing another configuration of an edge detector circuit shown in FIG. 4 according to the first embodiment of the present invention.

If a period for which the NMOS transistor VL3 is caused to be ON, or the ON-time of the NMOS transistor VL3, by the edge detector circuit 20 of FIG. 4 is short, the number of inverters of the delay circuit formed by the three inserters 23 through 25 may be increased, or alternatively, as shown in FIG. 6, a capacitor C3 may be connected between the output terminal of the inverter 23 and ground so as to increase a delay period. In the case of increasing the number of inverters, however, the total number of inverters should always be an odd number.

Figure 7:
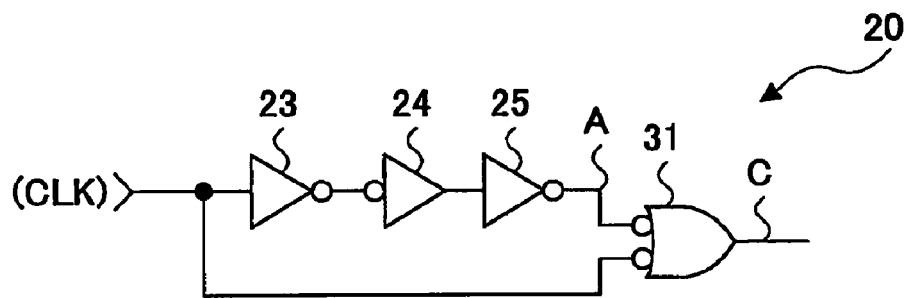
FIG. 7 is a diagram showing yet another configuration of the edge detector circuit shown in FIG. 4 according to the first embodiment of the present invention.
Figure 8:
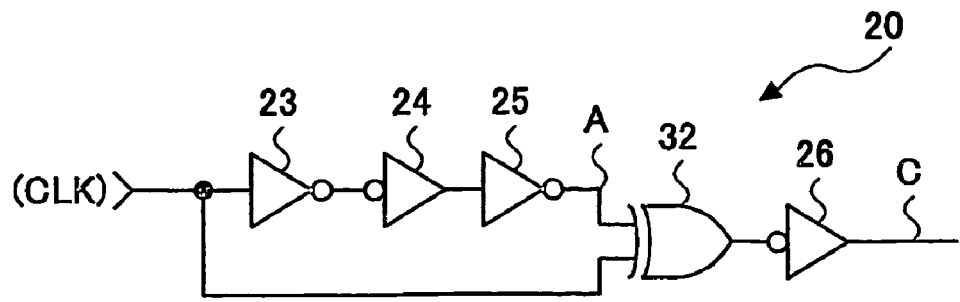
FIG. 8 is a diagram showing still another configuration of the edge detector circuit shown in FIG. 4 according to the first embodiment of the present invention.

In the case of detecting the falling edge of the clock signal CLK, the inverter 26 and the NAND circuit 27 in the edge detector circuit 20 of FIG. 4 may be replaced by a NOR circuit 31 as shown in FIG. 7. In order to detect both rising edge and falling edge of the clock signal CLK, the NAND circuit 27 in the edge detector circuit 20 of FIG. 4 may be replaced by an EXOR (exclusive-OR) circuit 32 as shown in FIG. 8. In FIG. 4, the current source 21 may be replaced by a resistor, and the inverter 22 may be replaced by a comparator having a reference voltage input to one of its input terminals.

Figure 9:
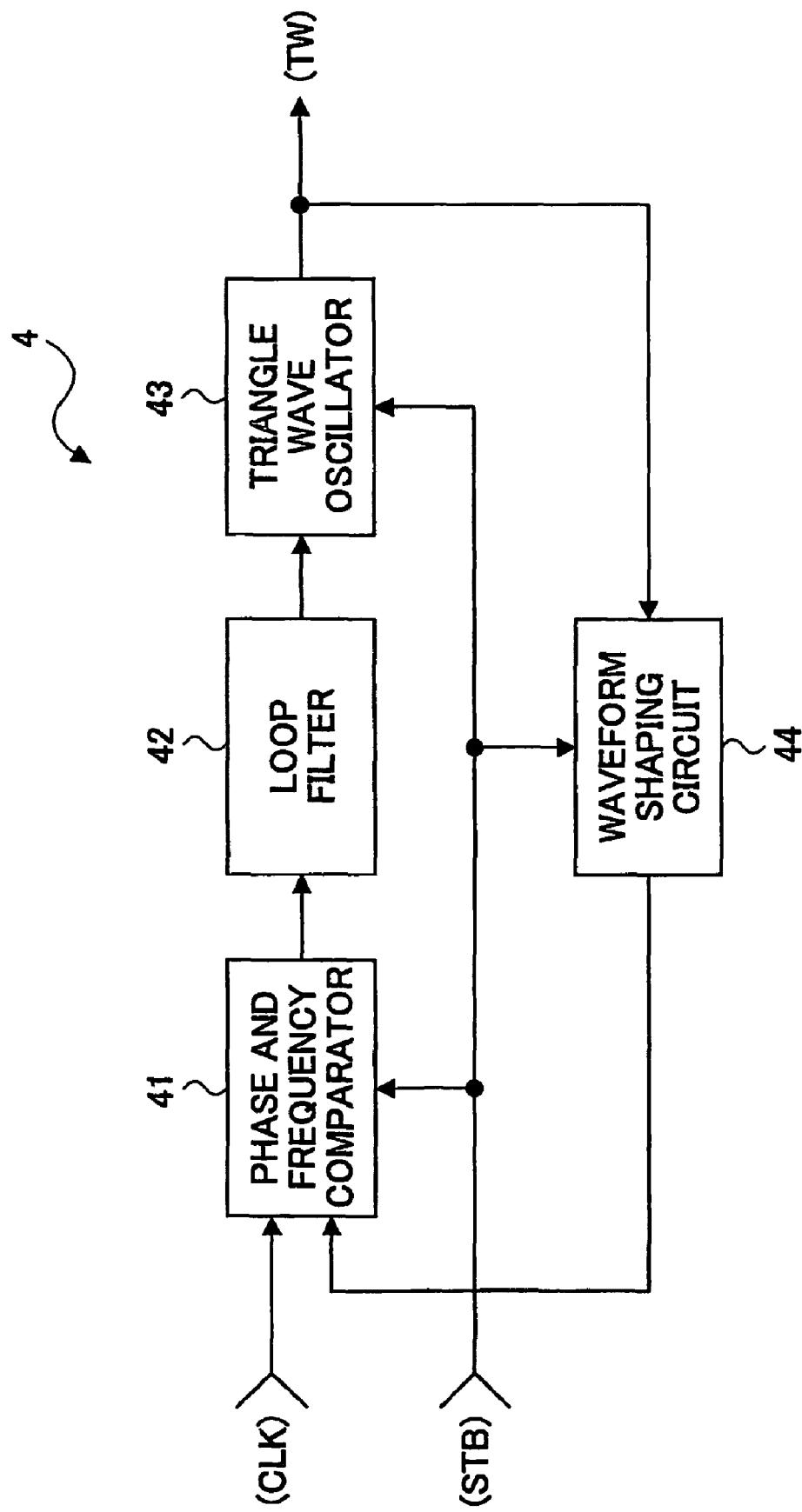
FIG. 9 is a block diagram showing an internal configuration of a triangle wave generator circuit shown in FIG. 3 according to the first embodiment of the present invention.

Next, FIG. 9 is a block diagram showing an internal configuration of the triangle wave generator circuit 4. FIG. 9 illustrates a case where a PLL circuit is employed.

Referring to FIG. 9, the triangle wave generator circuit 4 includes a phase and frequency comparator 41, a loop filter 42, a triangle wave oscillator 43, and a waveform shaping circuit 44. The phase and frequency comparator 41 compares the phases and frequencies of two input signals, and increases or decreases its output voltage in accordance with the results of the comparison. The loop filter 42 smoothes and outputs the output voltage of the phase and frequency comparator 41. The triangle wave oscillator 43 generates and outputs the triangle wave signal TW of a frequency according to voltage input from the loop filter 42. The waveform shaping circuit 44 converts the triangle wave signal TW output from the triangle wave oscillator 43 into a rectangular wave by shaping its waveform, and outputs the rectangular wave signal to the phase and frequency comparator 41.

The phase and frequency comparator 41 compares the phases and frequencies of the input clock signal CLK and the rectangular wave signal input from the waveform shaping circuit 44, and increases or decreases its output voltage in accordance with the results of the comparison. Further, the standby signal STB is input from the clock pulse detector circuit 7 to the phase and frequency comparator 41, the triangle wave oscillator 43, and the waveform shaping circuit 44. Each of the phase and frequency comparator 41, the triangle wave oscillator 43, and the waveform shaping circuit 44 stops its operation when the standby signal STB is asserted, and starts its operation when the standby signal STB is negated. Thus, the triangle wave generator circuit 4 stops its operation when the standby signal STB is asserted.

A switch for supplying the supply voltage Vdd to the phase and frequency comparator 41, the loop filter 42, the triangle wave oscillator 43, and the waveform shaping circuit 44 in accordance with the standby signal STB input to a control electrode may be provided so that the switch blocks supply of the supply voltage Vdd to the phase and frequency comparator 41, the loop filter 42, the triangle wave oscillator 43, and the waveform shaping circuit 44 when the standby signal STB is asserted, and allows supply of the supply voltage Vdd to the phase and frequency comparator 41, the loop filter 42, the triangle wave oscillator 43, and the waveform shaping circuit 44 when the standby signal STB is negated.

Figure 10:
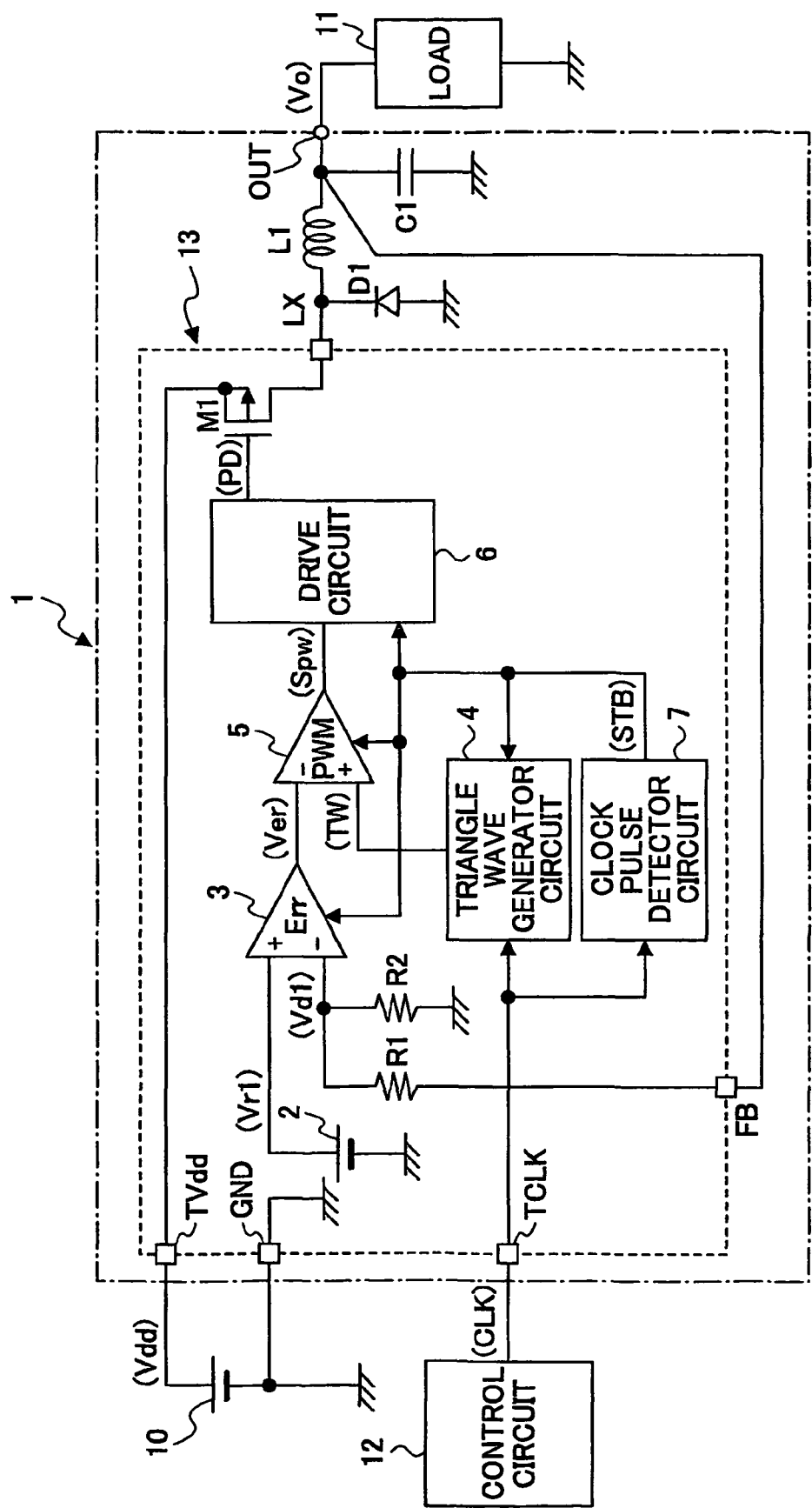
FIG. 10 is a circuit diagram showing another configuration of the switching regulator according to the first embodiment of the present invention.

The above description is given of the case of FIG. 3 where the synchronous rectification transistor M2 is employed. Alternatively, as shown in FIG. 10, a flywheel diode D1 may be used in place of the synchronous rectification transistor M2 In this case, if the diode D1 is, for example, a Schottky barrier diode and is difficult to integrate with the IC 13, the diode D1 is externally attached between the LX terminal of the IC 13 and ground. If the diode D1 is easy to integrate with the IC 13, the diode D1 is provided in the IC 13.

Thus, according to the switching regulator 1 of this embodiment, the clock pulse detector circuit 7 determines whether the clock signal CLK is input to the TCLK terminal. When the clock signal CLK is not input, the standby signal STB is asserted so that the standby operation performing a low power consumption operation is performed. When the clock signal CLK is input, the standby signal STB is negated so that a normal operation is performed. Thus, the standby signal STB is generated inside the switching regulator 1 in accordance with the presence or absence of the externally input clock signal CLK. This obviates the need for an input terminal for a standby signal conventionally required as an independent terminal. As a result, it is possible to reduce the number of necessary terminals of an IC package, thus making it possible to use a less expensive, smaller IC package. Further, conventionally, the standby signal is generated using an external CPU. According to one embodiment of the present invention, it is also possible to reduce the number of IC terminals of such an external circuit, thus making it possible to use a less expensive, smaller IC package for an IC forming the external circuit.

Second Embodiment

In the above-described first embodiment, the clock pulse detector circuit 7 generates the standby signal STB in accordance with the presence or absence of the clock signal CLK input from the TCLK terminal. Alternatively, as a second embodiment of the present invention, the standby signal STB may be asserted according to whether a predetermined triangle wave signal TW is output from the triangle wave generator circuit 4.

Figure 11:
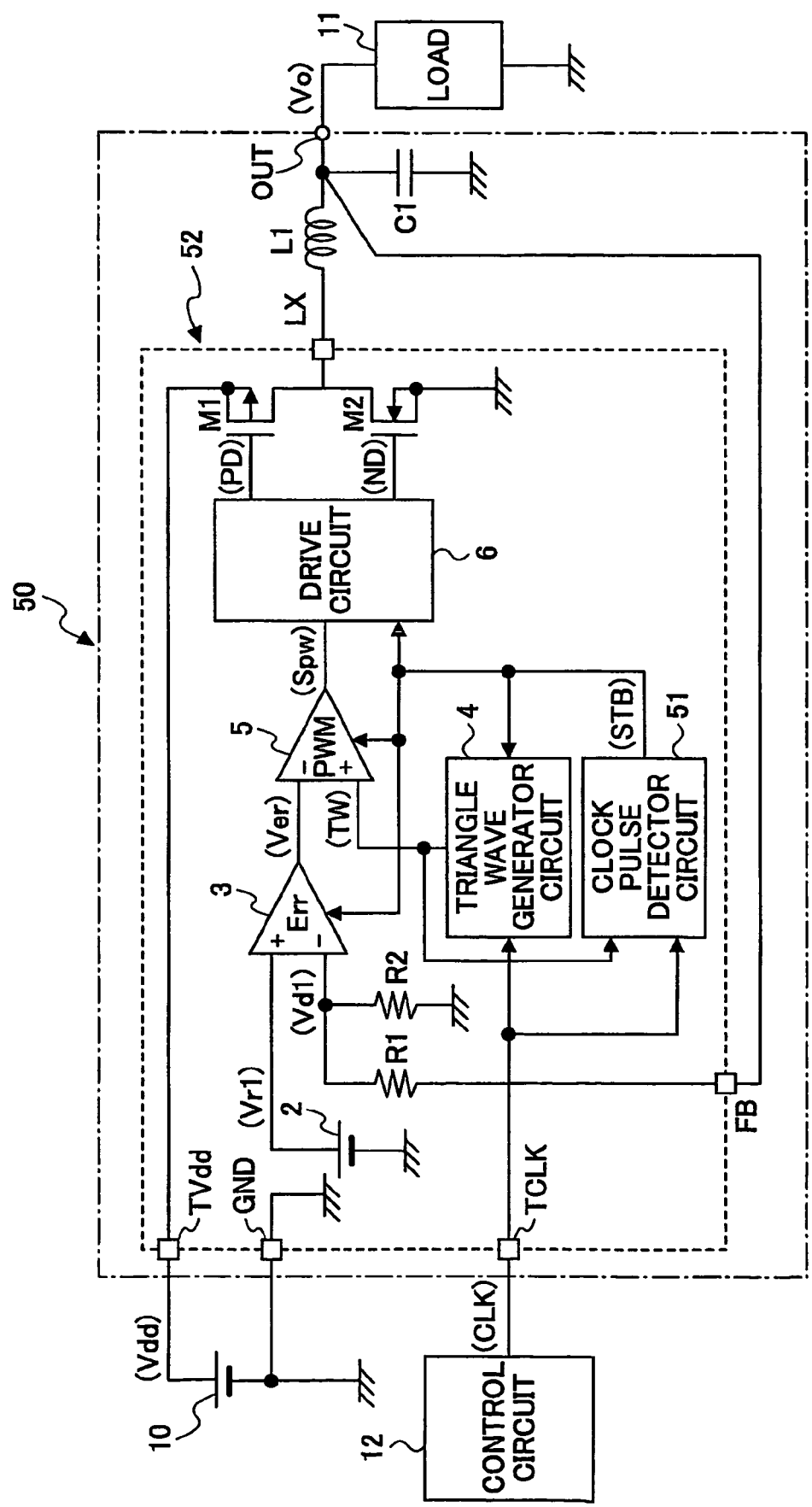
FIG. 11 is a circuit diagram showing a configuration of a switching regulator according to a second embodiment of the present invention.

FIG. 11 is a circuit diagram showing a configuration of a switching regulator so according to the second embodiment of the present invention. In FIG. 11, the same elements as or similar elements to those of FIG. 3 are referred to by the same numerals, and a description thereof is omitted.

According to the switching regulator 50 of this embodiment, a clock pulse detector circuit 51 asserts the standby signal STB according to whether the frequency of the triangle wave signal TW output from the triangle wave generator circuit 4 falls within a predetermined range, and negates the standby signal STB when detecting an input of the clock signal CLK after asserting the standby signal STB. The clock pulse detector circuit 51 may form a clock signal detector circuit part.

Referring to FIG. 11, the switching regulator 50 includes the switching transistor M1, the synchronous rectification transistor M2, the inductor L1, the capacitor C1, the resistors R1 and R2, the reference voltage generator circuit 2, the error amplifier circuit 3, the triangle wave generator circuit 4, the PWM circuit 5, the drive circuit 6, and the clock pulse detector circuit 51. The clock pulse detector circuit 51 controls the operation of each of the error amplifier circuit 3, the triangle wave generator circuit 4, the PWM circuit 5, and the drive circuit 6 according to whether the triangle wave signal TW of a frequency within a predetermined range is output from the triangle wave generator circuit 4. In the switching regulator 50, all parts except the inductor L1 and the capacitor C1 are integrated into a single IC 52.

The triangle wave signal TW provided from the triangle wave generator circuit 4 and the clock signal CLK provided from the control circuit 12 through the TCLK terminal are input to the clock pulse detector circuit 51. While the triangle wave signal TW of a frequency within a predetermined range is being output from the triangle wave generator circuit 4, the clock pulse detector circuit 51 negates the standby signal STB output to each of the error amplifier circuit 3, the triangle wave generator circuit 4, the PWM circuit 5, and the drive circuit 6.

When the triangle wave generator circuit 4 stops outputting the triangle wave signal TW of a frequency within a predetermined range, the clock pulse detector circuit 51 asserts the standby signal STB output to each of the error amplifier circuit 3, the triangle wave generator circuit 4, the PWM circuit 5, and the drive circuit 6.

Further, the clock pulse detector circuit 51 negates the standby signal STB when detecting an input of the clock signal CLK after asserting the standby signal STB.

In the above description, the clock pulse detector circuit 51 detects stoppage of inputting of the clock signal CLK from the output signal of the triangle wave generator circuit 4. Alternatively, the clock pulse detector circuit 51 may detect stoppage of inputting of the clock signal CLK from the output voltage of the phase and frequency comparator 41 or the loop filter 42 forming the triangle wave generator circuit 4.

Thus, according to the switching regulator 50 of the second embodiment, the clock pulse detector circuit 51 asserts the standby signal STB according to whether the output signal of the triangle wave generator circuit 4 is a triangle wave signal of a frequency within a predetermined range, and negates the standby signal STB when detecting an input of the clock signal CLK after asserting the standby signal STB. This makes it possible to produce the same effects as those of the first embodiment. Further, this also makes it possible to detect failure of the triangle wave generator circuit 4. It is possible to stop supplying the constant voltage to the load 11 when failure of the triangle wave generator circuit 4 is detected, thus making it possible to improve reliability.

A switching regulator according to one embodiment of the present invention includes a clock signal detector circuit part that, upon detecting stoppage of inputting of a clock signal, causes a control circuit part to stop operating and perform a standby operation for reducing power consumption and thereby to turn off the switching transistor. This obviates the need for an IC terminal to which a standby signal is externally input, which is conventionally required as an independent terminal, in an IC forming the switching regulator. Further, if an external control circuit generating the standby signal is formed of an IC, a terminal for outputting the standby is signal becomes unnecessary in the IC. Thus, it is possible to reduce the number of terminals required of an IC package, thus saving on the terminals of the IC package. If this saving results in a newly available terminal, it is possible to provide the IC with an additional function. Saving on IC terminals also makes it possible to use a less expensive, smaller IC package.

The present invention is not limited to the specifically disclosed embodiments, and variations and modifications may be made without departing from the scope of the present invention. The present application is based on Japanese Priority Patent Application No. 2004-287092, filed on Sep. 30, 2004, the entire contents of which are hereby incorporated by reference.

The invention claimed is:

1. A switching regulator converting an input voltage into a predetermined constant voltage and outputting the constant voltage from an output terminal, the switching regulator comprising:
   a switching transistor controlling output of the input voltage by switching in accordance with a control signal input to a control electrode;
   a smoothing circuit part configured to smooth an output voltage of the switching transistor and output the smoothed output voltage to the output terminal;
   a control circuit part configured to control the switching of the switching transistor in synchronization with an externally input clock signal so that a voltage at the output terminal is the predetermined constant voltage; and
   a clock signal detector circuit part configured to detect presence or absence of inputting of the clock signal, the clock signal detector circuit part comprising:
      an edge detector circuit configured to detect at least one of a rising edge and a falling edge of signal level of the clock signal and output a pulse of a predetermined pulse width for the detected at least one of the rising edge and the falling edge every time the at least one of the rising edge and the falling edge is detected;
      an integrating circuit configured to charge a capacitor with a preset time constant;

a switching device configured to release an electric charge stored in the capacitor upon the outputting of the pulse from the edge detector circuit; and a binarizing circuit configured to generate a control signal to perform operation control of the control circuit part by converting a terminal voltage of the capacitor into a binary signal, and output the generated control signal, wherein upon detecting stoppage of the inputting of the clock signal, the clock signal detector circuit part causes the control circuit part to stop operating and perform a standby operation for reducing power consumption and thereby to turn off the switching transistor, and wherein the switching transistor, the control circuit part, and the clock signal detector circuit part are integrated into a single IC.

2. The switching regulator as claimed in claim 1, wherein upon detecting the inputting of the clock signal, the clock signal detector circuit part causes the control circuit part to start operating and perform a normal operation and thereby to perform the switching of the switching transistor.

3. The switching regulator as claimed in claim 1, wherein the time constant is preset for the integrating circuit so that a period between stoppage of the release of the electric charge stored in the capacitor by the switching device and completion of the charging of the capacitor up to a predetermined voltage is longer than an interval at which the pulse is output from the edge detector circuit.

4. The switching regulator as claimed in claim 1, wherein the control circuit part comprises:

a reference voltage generator circuit configured to generate and output a predetermined reference voltage;

an output voltage detector circuit configured to detect the voltage at the output terminal, and generate and output a voltage proportional to the detected voltage;

an error amplifier circuit configured to compare the reference voltage and the proportional voltage, amplify a voltage difference between the reference voltage and the proportional voltage, and output the amplified voltage difference as an output voltage;

a triangle wave generator circuit configured to generate and output a predetermined-triangle wave signal synchronizing with the clock signal;

a PWM circuit configured to compare the output voltage of the error amplifier circuit and voltage of the triangle wave signal output from the triangle wave generator circuit, and generate and output a pulse signal for performing PWM control, the pulse signal having a pulse width according to the output voltage of the error amplifier circuit; and a drive circuit configured to control the switching of the switching transistor in accordance with the pulse signal from the PWM circuit, wherein upon the stoppage of the inputting of the clock signal, the clock signal detector circuit part causes each of the error amplifier circuit, the triangle wave generator circuit, the PWM circuit, and the drive circuit to stop operating and perform the standby operation for reducing power consumption and thereby to turn off the switching transistor.

5. The switching regulator as claimed in claim 4, wherein the clock signal detector circuit part determines that the inputting of the clock signal is stopped if a frequency of the triangle wave signal output from the triangle wave generator circuit does not fall within a predetermined range.

6. The switching regulator as claimed in claim 5, wherein the clock signal detector circuit part detects presence or absence of inputting of the clock signal to the triangle wave generator circuit, and causes the control circuit part to start operating and perform a normal operation and thereby to perform the switching of the switching transistor upon detecting the inputting of the clock signal to the triangle wave generator circuit after determining that the inputting of the clock signal is stopped.

7. The switching regulator as claimed in claim 4, wherein the triangle wave generator circuit comprises:

a PLL circuit, the PLL circuit including:

a waveform shaping circuit configured to convert the triangle wave signal into a rectangular wave signal by shaping the triangle wave signal, and output the rectangular wave signal;

a phase comparator configured to compare phases of the clock signal and the output signal of the waveform shaping circuit, and output a voltage according to a result of the comparison;

a filter circuit configured to smooth the output voltage of the phase comparator and output the smoothed voltage; and a triangle wave oscillator configured to generate and output the triangle wave signal of a frequency according to the output voltage of the filter circuit, wherein upon the stoppage of the inputting of the clock signal, the clock signal detector circuit part causes each of the waveform shaping circuit, the phase comparator, and the triangle wave oscillator to stop operating.

8. The switching regulator as claimed in claim 1, wherein the smoothing circuit part comprises a transistor for synchronous rectification connected in series to the switching transistor;

the control circuit part controls switching of the transistor for synchronous rectification; and the switching transistor, the transistor for synchronous rectification, the control circuit part, and the clock signal detector circuit part are integrated into a single IC.

9. The switching regulator as claimed in claim 8, wherein the IC comprises:

a first power supply terminal to which positive supply voltage is applied, the positive supply voltage forming the input voltage to be converted into the predetermined constant voltage;

a second power supply terminal to which negative supply voltage is applied;

a pulse output terminal from which a pulse signal from the switching transistor is output;

an output voltage input terminal to which the voltage output from the output terminal is input; and a clock signal input terminal to which the clock signal is input.

10. The switching regulator as claimed in claim 1, wherein the IC comprises:

a first power supply terminal to which positive supply voltage is applied, the positive supply voltage forming the input voltage to be converted into the predetermined constant voltage;

a second power supply terminal to which negative supply voltage is applied;

a pulse output terminal from which a pulse signal from the switching transistor is output;

an output voltage input terminal to which the voltage output from the output terminal is input; and a clock signal input terminal to which the clock signal is input.

* * * * *